United States Patent [19]

Clark et al.

[11] Patent Number: 4,915,035
[45] Date of Patent: Apr. 10, 1990

[54] AUTOMOBILE FOOD SERVICE TRAY

[76] Inventors: Bobby D. Clark; Shirley J. McMillan, both of P.O. Box 1821, Riverton, Wyo. 82501

[21] Appl. No.: 299,611

[22] Filed: Jan. 23, 1989

[51] Int. Cl.⁴ .............................................. A47B 23/00
[52] U.S. Cl. ....................................... 108/44; 248/444
[58] Field of Search ................... 108/44; 312/231, 233; 248/444

[56] References Cited

U.S. PATENT DOCUMENTS

| 2,749,655 | 12/1953 | Ashton | 108/44 X |
| 2,866,381 | 12/1958 | Alldredge | 108/44 X |
| 3,074,745 | 1/1963 | Burckhalter | 108/44 |
| 3,643,606 | 2/1972 | Vise | 108/44 |
| 3,952,988 | 4/1976 | Easterly | 108/44 X |
| 4,166,559 | 9/1979 | Richardson | 108/44 X |
| 4,453,788 | 6/1989 | Russell | 108/44 X |
| 4,805,867 | 2/1989 | McAllister | 108/44 X |

Primary Examiner—Peter A. Aschenbrenner
Attorney, Agent, or Firm—Lewis E. Massie

[57] ABSTRACT

A novel compact rigid food serving tray horizontally attached to an automobile steering wheel at any elevation regardless of the steering wheels inclination to the vertical.

The tray being supported on the steering wheel by two right angle frames slidably engaging longitudinal slots on each side of the bottom of the tray. The transverse portions of the frames inwardly turned towards each other and having means for adjusting the spacing therebetween.

A leakproof beverage container well located on the front center of the tray for holding cans, bottles, glasses and so forth.

1 Claim, 2 Drawing Sheets

AUTOMOBILE FOOD SERVICE TRAY

BACKGROUND OF THE INVENTION

1. Field of the Invention

This invention relates to a novel food service tray designed to be quickly and firmly attached to an automobile steering wheel and generally used for serving food and drink.

2. Description of the Prior Art.

The steering wheel tray described by McGinley in U.S. Pat. No. 2,249,025 is most pertinent to the present invention. The tray is designed to be quickly attached to the vehicle steering wheels of a substantial range of sizes arranged at varying inclinations to the vertical but at a fixed vertical position of the steering wheel. U.S. Pat. Nos. 2,856,251 Garrison, 2,244,861 Walker, and 2,746,821 Schroder describe trays of various designs for attaching to a vehicle steering wheel.

SUMMARY OF THE INVENTION

It is the general object of the present invention to provide a novel, compact and rigid serving tray that can be quickly attached horizontally to the steering wheel at any selected elevation regardless of the steering wheels inclination to the vertical. The tray having a well for supporting a beverage cup, a can or a bottle. The well being closed at the bottom to prevent condensation form the drink container from leaking through to the bottom of the tray.

The tray is supported on the steering wheel by the clamping action between the horizontal portions of two right angle frames and the front edge of the tray. The vertical portions of the two frames slidably engaging longitudinal slots on the bottom of the tray for accommodating steering wheels of various inclinations to the vertical. The horizontal portions of the frames inwardly turned towards each other and having means for transversely adjusting the spacing between the two frames for accommodating steering wheels of various outside diameters.

DETAILED DESCRIPTION OF THE PREFERRED EMBODIMENT

Figure 1:
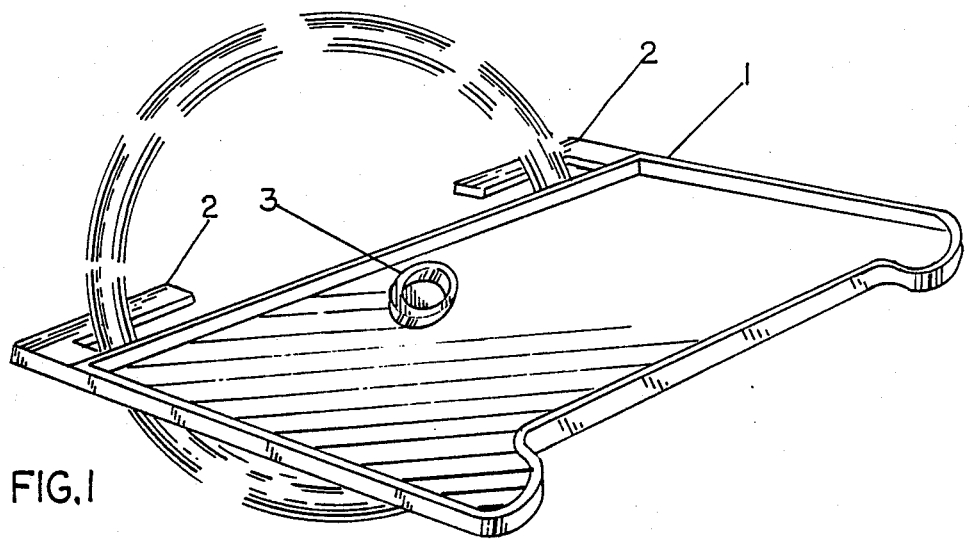
FIG. 1 is a top perspective view of the tray mounted on a steering wheel.
Figure 2:
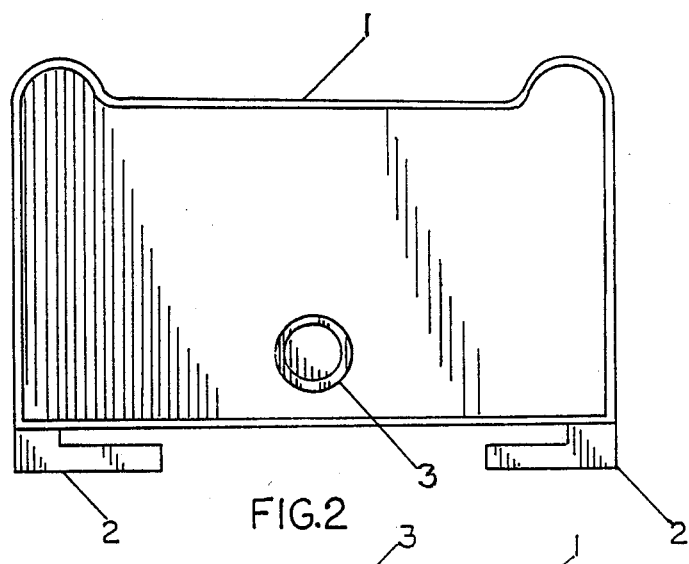
FIG. 2 is a plan view of the steering wheel service tray.
Figure 3:
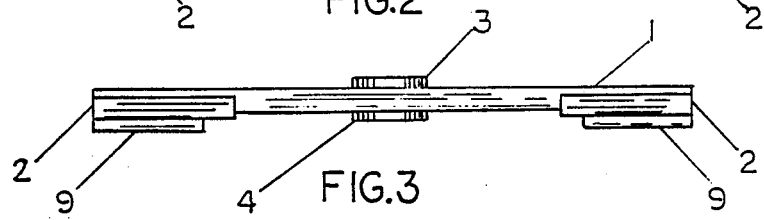
FIG. 3 is a front elevation of the steering wheel service tray.
Figure 4:
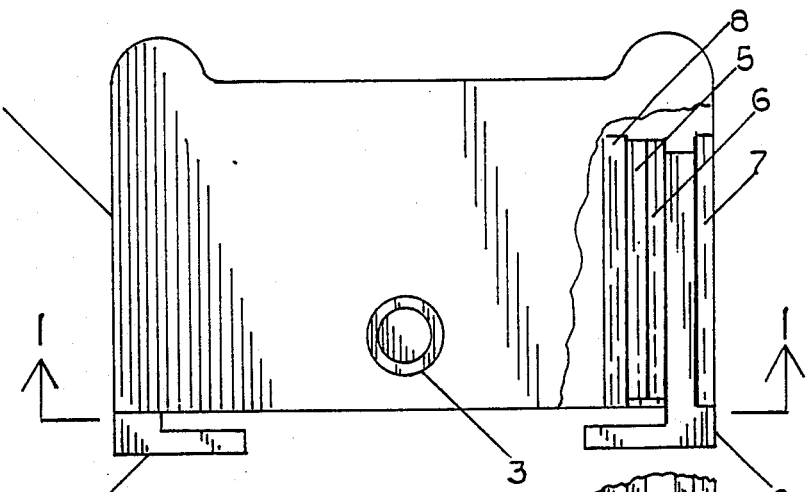
FIG. 4 is a partially sectioned plan view of the steering wheel service tray.
Figure 5:
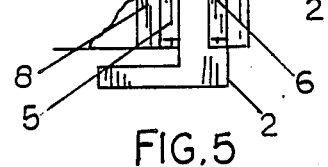
FIG. 5 is a detailed sections view of the horizontal frame member support slot.
Figure 6:
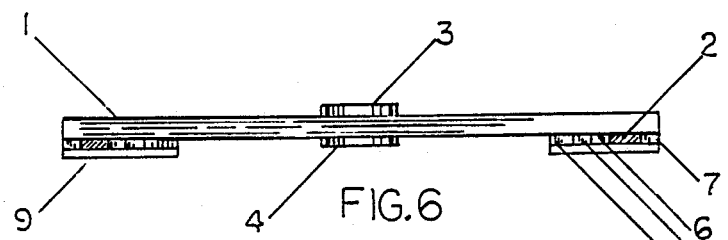
FIG. 6 is a sectional view through 1—1 of FIG. 4.
Figure 7:
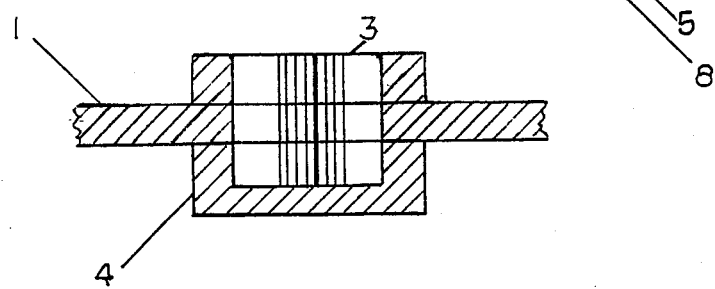
FIG. 7 shows the beverage container well.

In FIG. 1 a perspective view of the steering wheel tray 1 is shown mounted horizontally on the vehicle steering wheel by means of the clamping action of the horizontal frame members 2. The clamping frame members 2 are longitudinally slidable to provide the proper clamping action on the steering wheel for mounting the tray in a horizontal position. FIG. 2 is a plan view of the steering wheel tray 1 showing the clamping members 2 and the top of the beverage container well 3. FIG. 3 is a front view of the steering wheel tray 1 showing the top rim 3 of the beverage container well the closed bottom of the well 4, the front edge of the clamping frame members 2 and the slot support 9. FIG. 4 is a partially sectioned view of the steering wheel tray 1, the clamping frame members 2, the top rim of the beverage well 3, the slot assembly comprising the outside restraining members 7 and 8, the horizontal spacing strips 5 and 6. The slot for the vertical portion of the clamping member 2 is adjustable horizontally by repositioning the spacer strips 5 and 6. FIG. 6 is a sectional view through 1—1 of FIG. 4 and FIG. 7 is a sectional view of the beverage well top rim 3, the bottom rim 4 and a portion of the tray 1.

In use the horizontal frame members are transversely positioned to fit the outside diameter of the steering wheel. The tray is then positioned horizontally on the steering wheel by adjusting the longitudinal portion of the frames 2.

We claim:

1. A flat rectangular service tray for use on vehicle steering wheels having rims in a plane angularly to the horizontal wherein the improvement comprises:
    a. two right angle frame members each with the horizontal portions approximately one third the length of the vertical portions;
    b. the frames slidably supported by the vertical portions engaging longitudinal slots on each side of the bottom of the tray;
    c. the horizontal portions of the frame turned towards each other providing clamping action for attaching the tray to the steering wheel;
    d. the longitudinal slots having means for adjusting the transverse spacing between the vertical portions of the frame members;
    e. a beverage container support well located on the top front center of the tray; and,
    f. the beverage container well being water proof to prevent condensation on the beverage containers from leaking through to the bottom of the tray.

* * * * *